*Inventors*
*Peter Graneau*
*Zbigniew Bonikowski*
By
*their Attorneys*

United States Patent Office 3,018,978
Patented Jan. 30, 1962

3,018,978
ELECTRICAL ANALOGUE COMPUTING APPARATUS
Peter Graneau, London, and Zbigniew Bonikowski, Ealing, London, England, assignors to British Insulated Callender's Cables Limited, London, England, a British company
Filed Aug. 5, 1959, Ser. No. 831,821
Claims priority, application Great Britain Aug. 6, 1958
7 Claims. (Cl. 242—75.51)

This invention relates to electrical analogue computing apparatus for generating an electric potential (E) which is proportional to the reciprocal relationship (i.e. the ratio) between the angular speeds of rotation ($W_1$ and $W_2$) of two shafts, in other words, the output of the apparatus substantially satisfies the equation $$E = K\frac{W_1}{W_2}$$

where K is a constant. The apparatus can also be used for computing the reciprocal relationship between any two mechanical motions or electrical signals or one mechanical motion and one electrical signal, provided that each can be converted into a mechanical angular velocity.

The computing apparatus is especially suitable for controlling the tension in flexible material, e.g. wire, as it is being withdrawn from a braked supply drum on which it is coiled or as it is being wound onto a driven drum, and the present invention includes winding and unwinding apparatus in which the potential generated by the computing apparatus is used to control the speed of or the torque on the drum on to which the material is wound or from which it is unwound.

Figure 1:
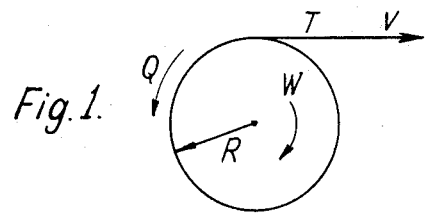
Figure 2:
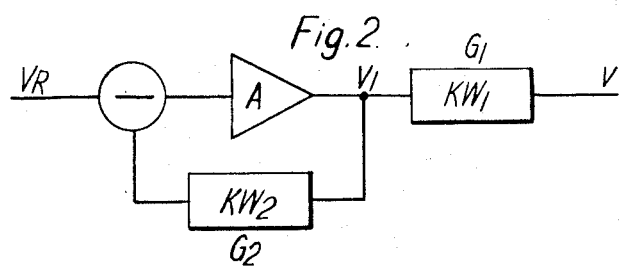
Figure 3:
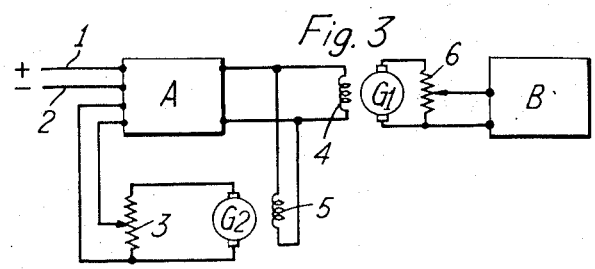
Figure 4:
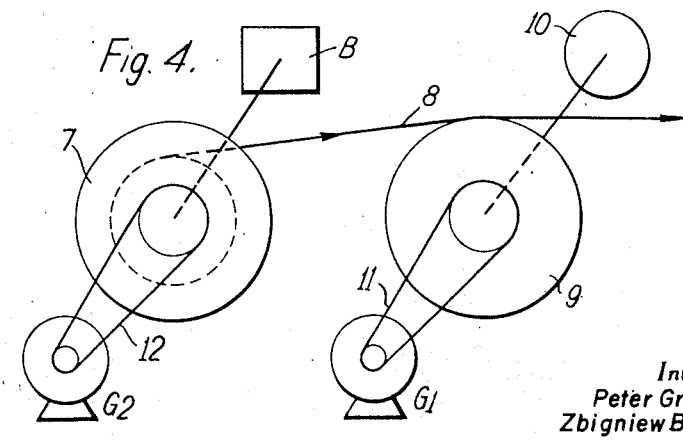

The invention will be illustrated by a description with reference to the accompanying drawings of its application to unwinding apparatus in which the braking torque on the drum from which the material is withdrawn is controlled by the computing apparatus. In the drawings, FIGURE 1 is a diagram showing the meaning of certain of the symbols used. FIGURE 2 is a block diagram of the computer circuit, FIGURE 3 is a more detailed circuit diagram of the computer, and FIGURE 4 is a diagrammatic drawing of unwinding apparatus in accordance with the invention.

To maintain constant tension in the material in an unwinding system as shown in FIGURE 1, it is necessary to vary the braking torque Q as the amount of material wound on the drum decreases, owing to the continual decrease in radius R of the coil of material remaining on the drum.

Under steady state conditions
if the linear speed of the flexible material = $v$
if the braking torque = $Q$
if the angular speed of the drum = $W$
if the tension in the flexible material = $T$ and the radius of the coil material remaining on the drum = $R$ then    $Q = RT$    (1)
and    $v = RW$    (2)
therefore $$Q = T\frac{v}{W} \quad (3)$$

Hence if T is to remain constant the braking torque Q must vary in accordance with the value of $$\frac{v}{W}$$

It is an object of the invention to provide computing apparatus which will generate a potential proportional to $$\frac{v}{W}$$

which can, for example, be utilised to control the braking torque of a braking device associated with a drum from which material is being unwound in such a way that the torque varies with $$\frac{v}{W}$$

The apparatus has other applications in computing.

Referring to FIGURE 2 computing apparatus in accordance with the invention comprises an amplifier A capable of giving an output potential which varies substantially linearly with its input potential (preferably a magnetic amplifier) and two D.C. generators $G_1$, $G_2$ each capable of generating in its armature an output potential which varies, for any given input potential to its field coils, substantially linearly with the speed of rotation of its shaft. The amplifier output ($V_1$) forms the input of one of the generators ($G_1$) whose output (V) is the required control potential, a constant reference potential ($V_R$) being applied to the amplifier input. The field coils of the generator $G_2$ are connected to the amplifier output and its armature is connected to the amplifier input in such a way that the generator $G_2$ acts as a feed-back circuit to the amplifier and that the generator output potential is subtracted from the reference potential.

Since the output of the generator $G_2$ is $KW_2V_1$ (where K is a constant and $W_2$ is the speed of rotation of its shaft) the resultant input to the amplifier is $$(V_R - KW_2V_1)$$

If the amplifier gain is A, then $$\frac{V_1}{V_R} = \frac{A}{1 + AKW_2} \quad (4)$$

since $V = V_1KW_1$ (where $W_1$ is the speed of rotation of $G_1$), then from (4)

$$\frac{V}{V_R} = \frac{AKW_1}{1 + AKW_2} \quad (5)$$

The circuit elements are so chosen and adjusted that the value of $AKW_2$ is very much greater than unity and hence, since $V_R$ is constant, then $$\frac{W_1}{W_2} = K'V \text{ (where } K' \text{ is a constant)} \quad (6)$$

Referring to FIGURE 3, the amplifier A is a magnetic amplifier of the kind sold by Electro-Methods Ltd. of Stevenage, Herts. as Type 570. It has a power gain of 10,000 to 15,000 and a maximum output of about 30 w. into 850 ohms, the power supply being 230–240 v. at 50 cycles. One D.C. input coil is connected through leads 1 and 2 to a constant source of potential at 11 v. ($V_R$) and another to a 10 kilohm variable potentiometer 3.

The output of the amplifier A is fed in parallel to the field windings 4 and 5 of two separately excited D.C. generators $G_1$ and $G_2$. These generators are of the type sold by Evershed and Vignoles Ltd. as FA5/B5. At their maximum excitation of 50 milliamps, they generate 60 v. per 1,000 r.p.m.

The output of generator $G_2$ is fed to the potentiometer 3 and the output of the generator $G_1$ is fed through a 5 kilohm variable potentiometer 6 to a braking device B.

Referring to FIGURE 4, the unwinding apparatus comprises a drum 7 from which filamentary material 8 is unwound by means of a capstan 9, driven by a motor 10. The motor 10 may drive the capstan 9 at a constant speed or at a speed varying in accordance with the requirements of further apparatus (e.g. a sheathing extruder if the material is wire) towards which the filamentary material is fed by the capstan 9. The drum 7 is mechanically coupled to the braking device B (also shown in FIGURE 3), which may be a device in accordance with our copending application Serial No. 831,822 comprising an alternating current rotary electrical machine controlled by one or more saturable reactors, which may themselves be controlled by the output potential of a magnetic amplifier. In this latter case, the input (signal coil) of the magnetic amplifier will be connected to the potentiometer 6, which can be suitably adjusted to match the impedance of the coil.

Any other braking device can be used provided that the braking torque bears a substantially linear relationship with the control potential V generated by the computer circuit.

Referring again to both FIGURES 3 and 4, the capstan 9 is coupled to the generator ($G_1$) by a chain drive 11 with a ratio of 12:1 and the drum 7 is coupled to the generator ($G_2$) by a chain drive 12 with a ratio of 8:1.

The generator ($G_1$) is driven at an angular speed $W_1$ by the capstan 9 by which the material 8 is withdrawn from the supply durm 7 and the generator ($G_2$) is driven by the drum spindle (at an angular speed $W_2$). Since the speed of rotation of the capstan is directly proportional to the linear speed ($v$) of the flexible material, then $$\frac{W_1}{W_2}=\frac{K''v}{W_2}\text{(where }K''\text{ is a constant)} \quad (7)$$

and $$V=\frac{K''v}{K'W_2}\text{(Substituting (6))} \quad (8)$$

The apparatus described is designed for linear speeds, of the material 8, varying from 50 to 1,000 ft. per minute when unwound from a radius of 2″ to 12″ on the drum 7. We prefer to use a braking device capable of exerting a torque such that the tension in the material 8 between the drum and capstan can be varied between 2 and 10 lbs., by adjusting the potentiometer 6. The control for the potentiometer can conveniently be calibrated to show the tension in the material 8.

The computing apparatus described can also be used in a similar way to control the tension in material being wound on to a drum, the control potential V then being used to control the motor driving the drum. The use of the apparatus in accordance with the invention for controlling the tension in a flexible material being withdrawn from a supply drum or wound on to a take-up drum has the advantage over known systems that no direct measurement of the wire tension, as by jockey pulleys, is necessary and the snatch and hunting associated with such devices is eliminated.

Although the computing apparatus in accordance with the invention has been described in its specific application to tension control, it is generally applicable to the generation of a D.C. signal which varies in accordance with the ratio between any two measurable quantities which can be represented as, or converted into, speeds of rotation.

What we claim as our invention is:

1. Electrical analogue computing apparatus for generating a potential substantially proportional to the ratio between the angular speeds of rotation of two shafts comprising an amplifier capable of giving an output potential which varies substantially linearly with its input potential, means for applying a constant reference potential to the amplifier input, two D.C. generators each capable of generating in its armature an output potential which varies, for any given input potential to its field coils, substantially linearly with the speed of rotation of its shaft, means for coupling said two shafts one to each of the shafts of said D.C. generators, means for applying the amplifier output to the input of the first of said generators, whose output is the required control potential, and to the input of the second of said generators, and means for connecting the output of the second of said generators to the amplifier input in such a way that it acts as a feedback to the amplifier.

2. Apparatus for regulating the torque applied to a drum, from which flexible material is being unwound, in accordance with a control potential substantially proportional to the relationship between the angular speed of rotation of the drum and the linear speed of the material, comprising an amplifier capable of giving an output potential which varies substantially linearly with its input potential, means for applying a constant reference potential to the amplifier input, two D.C. generators each capable of generating in its armature an output potential which varies, for any given input potential to its field coils, substantially linearly with the speed of rotation of its shaft, means for applying the amplifier output to the input of the first of said generators, whose output is the required control potential and to the input of the second of said generators, means for connecting the output of the second of said generators to the amplifier input in such a way that it acts as a feed-back to the amplifier, means for driving the shaft of the first generator at a speed proportional to the linear speed of the material and means for driving the shaft of the second generator at a speed proportional to the speed of rotation of the drum.

3. Apparatus as claimed in claim 2 for unwinding flexible material from a drum in which the drum is braked by a device which exerts a torque bearing a substantially linear relationship to the control potential and in which the material is withdrawn from the drum by a capstan coupled to the first generator.

4. Apparatus as claimed in claim 1, in which the amplifier is a magnetic amplifier.

5. Apparatus as claimed in claim 2, in which the amplifier is a magnetic amplifier.

6. Apparatus for regulating the torque applied to a drum, on to which flexible material is being wound in accordance with a control potential substantially proportional to the relationship between the angular speed of rotation of the drum and the linear speed of the material comprising an amplifier capable of giving an output potential which varies substantially linearly with its input potential, means for applying a constant reference potential to the amplifier input, two D.C. generators each capable of generating in its armature an output potential which varies, for any given input potential to its field coils, substantially linearly with the speed of rotation of its shaft, means for applying the amplifier output to the input of the first of said generators, whose output is the required control potential and to the input of the second of said generators, means for connecting the output of the second of said generators to the amplifier input in such a way that it acts as a feed-back to the amplifier, means for driving the shaft of the first generator at a speed proportional to the linear speed of the material and means for driving the shaft of the second generator at a speed proportional to the speed of rotation of the drum.

7. Apparatus as claimed in claim 6, in which the amplifier is a magnetic amplifier.

References Cited in the file of this patent

UNITED STATES PATENTS

| | | |
|---|---|---|
| 2,715,701 | Moore et al. | Aug. 16, 1955 |
| 2,748,329 | Allbert et al. | May 29, 1956 |
| 2,874,917 | Pell | Feb. 24, 1959 |
| 2,913,661 | Westburg | Nov. 17, 1959 |